Patented Dec. 14, 1948

2,456,228

UNITED STATES PATENT OFFICE 2,456,228

METHOD OF DISPERSING A SOLID POLYMERIZATION CATALYST IN A POLYMERIZABLE THERMOSETTING RESIN SIRUP

Welcome I. Weaver, Toledo, Ohio, assignor to Libbey-Owens-Ford Glass Company, Toledo, Ohio, a corporation of Ohio No Drawing. Application December 8, 1943, Serial No. 513,493

4 Claims. (Cl. 260—40)

The invention relates to the preparation of a hardenable composition comprising a viscous polymerizable product and a solid polymerization catalyst.

A viscous polymerizable product is highly advantageous for the production of a hardened synthetic resin because it has excellent physical properties for use in a molding composition, adhesive or impregnating composition, and because hardening by polymerization, unlike hardening by condensation, takes place without evolution of volatiles.

In order to have the proper physical properties for use in a molding composition, adhesive or impregnating composition, a hardenable or polymerizable product should be resinous in character, i. e., it should be viscous or tacky at a temperature above its melting point. Non-resinous materials ordinarily are non-viscous at temperatures above their melting points, and form nonviscous solutions. If a material is not viscous or resinous, it cannot be used as the binder in a molding composition because it is squeezed out of the filler and squirted out of the mold. Similarly, a nonviscous material cannot be used as a binder for impregnating a fabric for use in a laminating operation, because it is squeezed out of the fabric by the laminating pressure. A material must be viscous or resinous to be used as an adhesive because a nonviscous material is not tacky enough to seal the opposing surfaces together and soaks into the surfaces to be glued instead of remaining between the opposing surfaces.

Since the speed of hardening of a polymerizable material increases with temperature, such a material should have a relatively low softening point so that it is soft and plastic at temperatures at which hardening is not rapid. If the material softens only at a relatively high temperature at which hardening is rapid, forming of the material is difficult because hardening interferes with forming at temperatures at which the material is plastic.

A hardenable or polymerizable resinous material which has the required low softening point usually has a softening point below ordinary temperatures so that it is in the form of a soft viscous mass at ordinary temperatures.

A material that hardens by polymerization rather than condensation, and therefore without evolution of volatiles which tend to form blisters and other flaws, requires the addition of a polymerization catalyst in order to cause hardening to take place. Such polymerization catalysts usually are solids.

Considerable difficulties have been experienced in incorporating a solid polymerization catalyst in this desirable type of viscous polymerizable product.

The principal object of the invention is to obviate the difficulties in the preparation of a composition comprising a viscous polymerizable product and a solid polymerization catalyst. More specific objects and advantages are apparent from the description which merely discloses and illustrates the invention and is not intended to impose limitations upon the claims.

Even when a solid polymerization catalyst is finely powdered, it is very difficult to mix the solid catalyst uniformly with a viscous polymerizable product. The solid polymerization catalyst tends to form lumps or agglomerations that are very difficult to break up in mixing the catalyst with the viscous product.

It has been discovered that the agglomerations or lumps that form when a solid polymerization catalyst is mixed with a viscous polymerizable product result in serious harm in that they cause polymerization of the product to take place at an accelerated rate in the vicinity of the agglomerations. Polymerization of such a product is a self-accelerating exothermic reaction, the rate of which is very sensitive to the concentration of the polymerization catalyst. Thus an agglomeration or lump of the catalyst greatly accelerates the polymerization of the surrounding material. Although the heat generated by polymerization at a moderate rate ordinarily is conducted away about as fast as it is formed, the accelerated polymerization of the material surrounding an agglomeration or lump of the catalyst generates heat faster than it can be carried away. The resulting rise in temperature further accelerates the polymerization of the material and the localized polymerization may become so violent that sudden and premature hardening of the whole body of the material may be touched off. In any case, the localized over-heating and over-polymerization results in a non-uniform product.

Attempts have been made to incorporate a solid polymerization catalyst in a viscous polymerizable product by dissolving the catalyst in a common solvent and then mixing the solvent with the viscous product. Such a solvent is difficult to remove from the viscous material. Ordinarily it is volatile at the temperatures at which the material is formed or hardened when the material is used in a molding composition, adhesive or impregnating composition, and the volatilization of the solvent during hardening tends to produce blisters and other flaws. Thus the use of a volatile solvent in a viscous polymerizable product is highly undesirable, and tends to counteract the advantages of a product that hardens by polymerization over a product that hardens by condensation.

In accordance with the invention, a hardenable composition comprising a viscous polymerizable product and a solid polymerization catalyst may be prepared by dispersing a quantity of the catalyst in a substantially greater quantity of a filler, and mixing the resulting dispersion with the viscous polymerizable product. If the polymerizable product is not too viscous, the mixing may be carried out readily at room temperatures in any suitable mixing or kneading apparatus. If the viscosity of the polymerizable product is sufficiently great, it may be desirable to warm the product to reduce its viscosity so as to facilitate the mixing.

In the incorporation in a viscous polymerizable product of a dispersion of a solid polymerization catalyst in a substantially greater quantity of a filler, the catalyst is diluted by the filler. It has been discovered that even when an agglomeration or lump of such a filler occurs in the viscous polymerizable product, there is no local overpolymerization of the product because the concentration of the solid polymerization catalyst even in such an agglomeration is in effect substantially reduced by dilution with the filler.

The effect of the filler in diluting the solid polymerization catalyst is a physical rather than a chemical phenomenon so that the present invention may be practiced regardless of what filler is employed. The solid polymerization catalyst may be dispersed in a granular mineral filler, such as a powdered clay or any other mineral filler, by grinding in a ball mill.

Greatly superior results are obtained in the practice of the invention, however, when the filler employed is a fibrous filler, and when the invention is carried out by impregnating the fibrous filler with a solution of the solid polymerization catalyst and drying before the filler is mixed with the viscous polymerizable product. The fibrous filler may be alpha cellulose, wood flour, or any other fibrous filler that can be impregnated with a solution of the solid polymerization catalyst. The solvent employed to prepare such a solution may be any liquid which is capable of dissolving the catalyst without reacting with or otherwise destroying it and which is volatile so that it can be removed by drying the filler after the impregnation. The amount of the solvent is simply the amount sufficient to dissolve the solid polymerization catalyst. The amount of the filler is simply an amount sufficient to soak up all of the solution. Because of the molecular distribution of the solid catalyst on the surfaces of the fibers that is present after the impregnation and drying of the filler, a relatively small proportion of a fibrous filler may be employed. However, the best results are obtained when the amount of the fibrous filler is substantially greater than the amount of the solid polymerization catalyst.

Incorporation of the solid polymerization catalyst by the present method does not impair the activity of the catalyst in any respect. A catalyst that has been incorporated by the present method in a viscous polymerizable product is just as active as if the catalyst were in solution with the viscous polymerizable product.

The results obtained by the present invention are independent of the specific nature of the solid polymerization catalyst. The solid polymerization catalysts most commonly used are organic peroxides, such as succinyl peroxide, acetyl peroxide, peracetic acid, perbenzoic acid, toluyl peroxide, p-brombenzoyl peroxide, anisoyl peroxide, chloroacetyl peroxide and furoyl peroxide, organic ozonides, such as diisopropylene ozonide, diisobutylene ozonide, and mixtures of such substances. The proportion of catalyst is simply the proportion that causes the viscous polymerizable product to harden at the desired rate.

The present invention is equally applicable to all viscous polymerizable products, for the reasons explained above. A typical example of such a product is a polymerizable unsaturated polyester prepared by reaction of a polyhydric alcohol with a polybasic acid, for example, by reaction of an unsaturated dibasic acid, such as maleic, fumaric, itaconic, citraconic or mesaconic acid, with a dihydric alcohol such as any polymethylene glycol in the series from ethylene glycol to decamethylene glycol, propylene glycol, any butylene glycol, and polyethylene glycol in the series from diethylene glycol to nonaethylene glycol, dipropylene glycol, any glycerol monobasic acid monoester (either in the alpha or beta position), such as monoformin or monoacetin, any monoether of glycerol with a monohydric alcohol, such as monomethylin or monoethylin, or any dihydroxy alkane in which the alcohol radicals are primary or secondary or both, in the series from dihydroxy butane to dihydroxy decane.

Even when the viscous polymerizable product is an unsaturated polyester, its properties may vary widely. In the preparation of a polymerizable unsaturated polyester, any of the usual modifiers, such as other dibasic acids, monobasic acids, tribasic acids, other dihydric alcohols, trihydric alcohols, monohydric alcohols and natural resin acids may be added. The larger the proportions of monobasic acids and monohydric alcohols, the lower is the average number of acid and alcohol residues in the resulting polyester molecules, and the lower is the viscosity of the polyester. On the other hand, the more nearly equal the molecular proportions of dibasic acid and dihydric alcohol, the greater is the average number of residues in the resulting polyester molecules, and the greater is the viscosity. The proportions of ingredients used are those proportions that produce a polymerizable polyester of the desired viscosity. The infusibility, hardness and inertness of the product obtained by polymerization of the polyester may be increased by varying the initial reacting ingredients to increase the average number of double bonds per molecule of the polymerizable polyester.

The point to which the reaction of the ingredients is carried in the preparation of the polymerizable polyester is simply that point at which the product has the desired consistency. The consistency or viscosity of the polyester varies directly with the average number of acid and alcohol residues in the molecules. For example, the average number of residues in the molecule of the polyester may vary from about three to about one hundred twenty.

If desired, the reaction may be expedited by use of an acid substance as a catalyst. Any organic acid, inorganic acid or acid salt that is soluble in the reaction mixture may be employed as a catalyst, but it is desirable that any acid substance used be readily volatile or be of such a character that it has no deleterious effect in the final product. The amount of acid catalyst employed is simply that amount which accelerates the esterification to the desired degree.

The reaction is carried out at a temperature high enough and for a time long enough to secure the desired consistency. An elevated temperature preferably is employed to expedite the reaction, but during the preparation of the polyester, the temperature should not be so high nor the time of reaction so long as to cause substantial polymerization. There is less danger of premature polymerization if an inhibiting agent is added before the esterification is carried out.

Whenever added, an inhibiting agent is used in the proportion required to give the desired degree of inhibiting effect. It may be necessary to use different inhibitors in widely different proportions in order to secure the same inhibiting effect.

The presence of an inhibitor may be desirable to cause the polyester to remain stable during storage or shipment. Any desired anti-oxidant such as hylroquinone, pyrogallol, tannic acid or any aromatic amine, such as aniline or phenylene diamine may be employed as an inhibitor. Although an inhibitor when present in the polyester stabilizes the polyester during storage, the polyester may be cured without difficulty after a solid polymerization catalyst has been incorporated in accordance with the present invention.

The preparation of the unsaturated polyester preferably is carried out in an atmosphere of an inert gas such as carbon dioxide, nitrogen or the like, in order to prevent darkening or to make it possible to obtain a pale or colorless product. Bubbling the inert gas through the reacting ingredients is advantageous in that the gas serves the added functions of agitation and of expediting the removal of water formed by the reaction. Exclusion of oxygen is desirable not only because it causes discoloration, but also because it tends to produce premature polymerization.

The acid number of the product depends upon the degree of reaction and the proportions of acid and alcohol used for the reaction. With equimolecular proportions of dibasic acid and dihydric alcohol, the reaction may be carried to an acid number of about 20. The use of an acid catalyst may make it possible to attain a lower acid number without substantial polymerization.

Example

From 2 to 3 parts of benzoyl peroxide are dissolved in benzene or any other volatile aromatic hydrocarbon, and 30–70 parts of alpha cellulose flock are impregnated with the resulting solution, dried and ground to a powder in a ball mill. (An alternative procedure consists in grinding the benzoyl peroxide and the alpha cellulose flock together in a ball mill for 24 hours.) The resulting material is mixed with 40 parts of a viscous polymerizable product by kneading in a Banbury mixer or by mixing on rolls. If the viscous polymerizable product employed is a reaction product of maleic anhydride or fumaric acid with an equivalent amount of ethylene glycol or diethylene glycol, having an acid number from about 20 to about 30, the material after incorporation of the filler is a soft plastic mass useful as a molding composition, which is readily moldable even at room temperature. In the case of a reaction product of fumaric acid with ethylene glycol or diethylene glycol, the proportion of benzoyl peroxide may be reduced to 0.5 part. A molding composition so prepared hardens in 5 to 15 seconds at 130–160° C. to a hard, tough, infusible product. If a different polymerizable product is employed having a lower viscosity, the composition may have a consistency suitable for use as an adhesive, impregnating or laminating composition for hot-pressing. In the preparation of an adhesive, impregnating or laminating composition, the proportion of alpha cellulose would be reduced to about 2–5 parts.

Various embodiments of the invention may be devised to meet various requirements.

Having described my invention, I claim:

1. A method of adequately dispersing a solid polymerization catalyst selected from the class consisting of organic peroxides and organic ozonides in a viscous polymerizable thermosetting resin syrup of an unsaturated polyhydric alcohol-polycarboxylic acid polyester having the characteristic of exothermic polymerization that comprises impregnating a filler with not more than enough of a volatile solution of the catalyst to be entirely soaked up by the filler, drying the filler to remove the volatiles and mixing the catalyst-impregnated filler with the viscous syrup.

2. A method as claimed in claim 1 in which the polymerization catalyst is benzoyl peroxide.

3. A method as claimed in claim 1 in which the filler is alpha cellulose.

4. A method as claimed in claim 3 in which the polymerization catalyst is benzoyl peroxide.

WELCOME I. WEAVER.

REFERENCES CITED

The following references are of record in the file of this patent:

UNITED STATES PATENTS

| Number | Name | Date |
| --- | --- | --- |
| 1,894,934 | Weiss | Jan. 17, 1933 |
| 2,142,980 | Huijser et al. | Jan. 3, 1939 |
| 2,192,129 | Ellis | Feb. 27, 1940 |
| 2,267,737 | Ipatieff et al. | Dec. 30, 1941 |

FOREIGN PATENTS

| Number | Country | Date |
| --- | --- | --- |
| 497,175 | Great Britain | Dec. 14, 1938 |